United States Patent [19]

Igeta

[11] 4,027,900
[45] June 7, 1977

[54] SEAT BELT ASSEMBLY

[76] Inventor: Harutoshi Igeta, No. 1518, Kire-cho, Higashisumiyoshi, Osaka, Osaka, Japan

[22] Filed: July 9, 1975

[21] Appl. No.: 594,432

[30] Foreign Application Priority Data

Mar. 27, 1975 Japan .......................... 50-42695[U]
Mar. 27, 1975 Japan .......................... 50-42696[U]
Mar. 27, 1975 Japan .......................... 50-42697[U]

[52] U.S. Cl. .............................. 280/745; 280/747; 297/388; 297/389
[51] Int. Cl.² .......................................... B60R 21/10
[58] Field of Search ............. 280/150 SB, 744, 745, 280/747; 297/385, 388, 389; 180/82 C

[56] References Cited

UNITED STATES PATENTS

| 3,830,518 | 8/1974 | Silber | 280/150 SB |
| 3,895,824 | 7/1975 | Bauer et al. | 280/150 SB |
| 3,900,078 | 8/1975 | Otani | 280/150 SB X |

Primary Examiner—Joseph F. Peters, Jr.
Assistant Examiner—Michael J. Forman
Attorney, Agent, or Firm—Wenderoth, Lind and Ponack

[57] ABSTRACT

Two belts are attached to the free end of a horizontal pivot arm having its base pivotally mounted to the roof of the car. One belt intended for the shoulder belt is fixedly attached to the pivot arm while the other intended for the waist belt is removably attached thereto. The pivot arm is pivoted by a motor from a front-facing position toward the center pillar of the car, pulling these belts. After the pivot arm is pivoted and gets locked, only the waist belt is lowered by transfer means to its operative position where it is stretched across the waist of the seat occupant. The shoulder belt remains there so as to extend diagonally from his waist to shoulder. This invention provides easy-to-handle seat belt assemblies.

7 Claims, 21 Drawing Figures

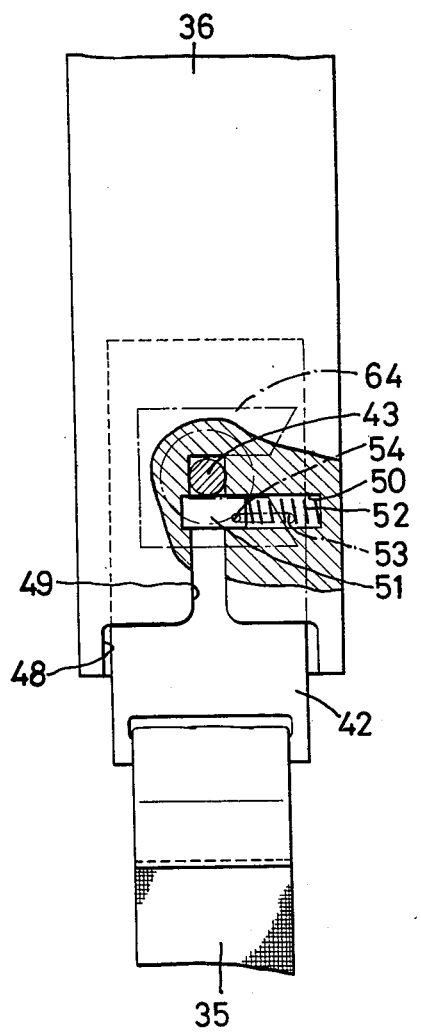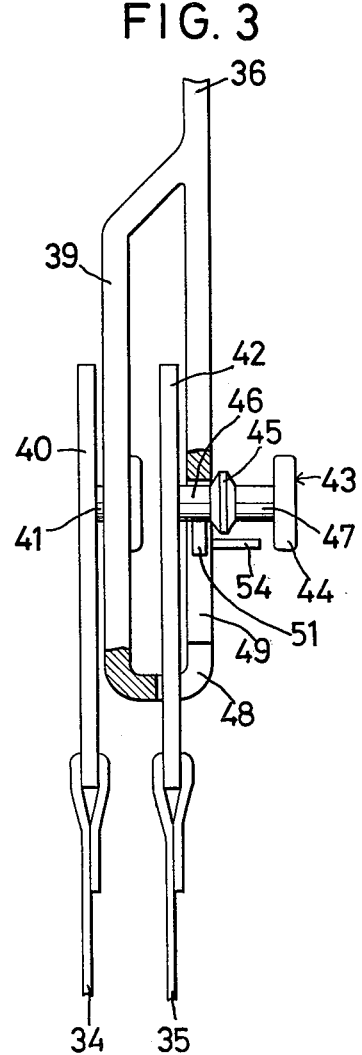

FIG.4
FIG.5
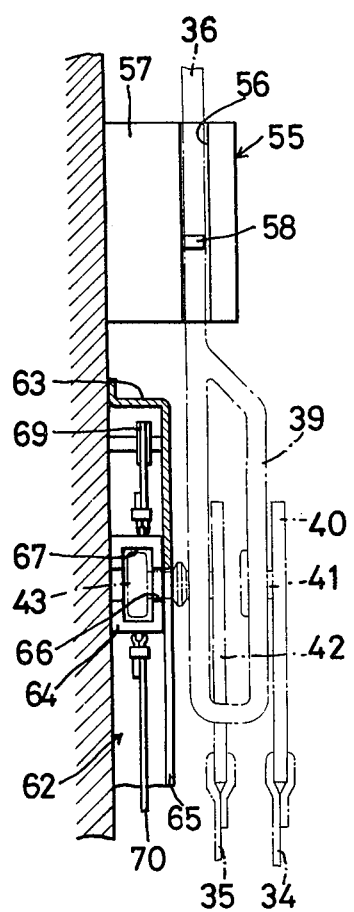
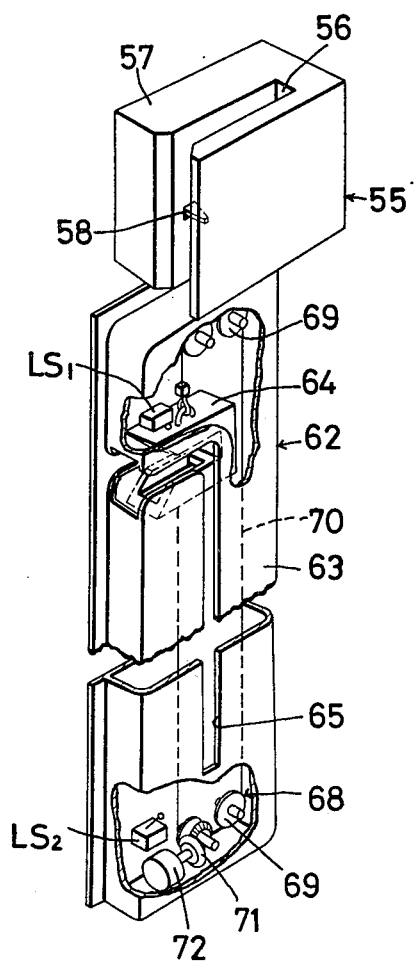

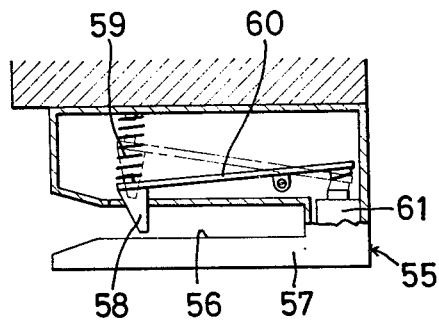
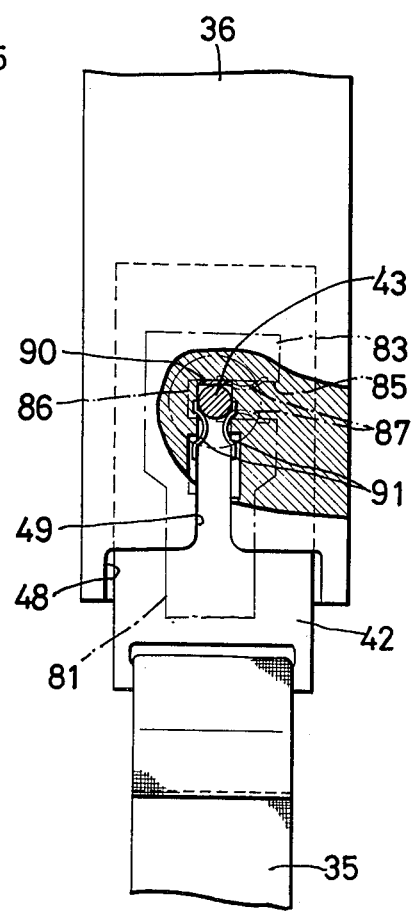
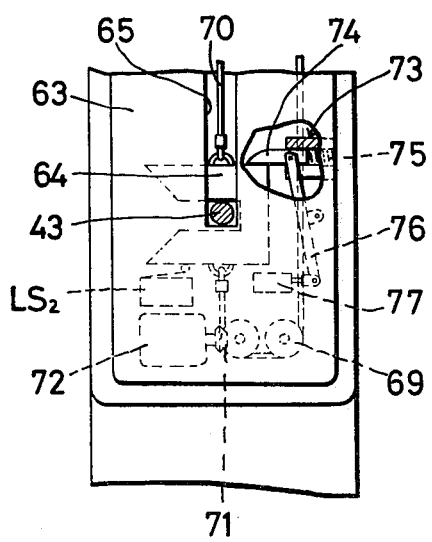

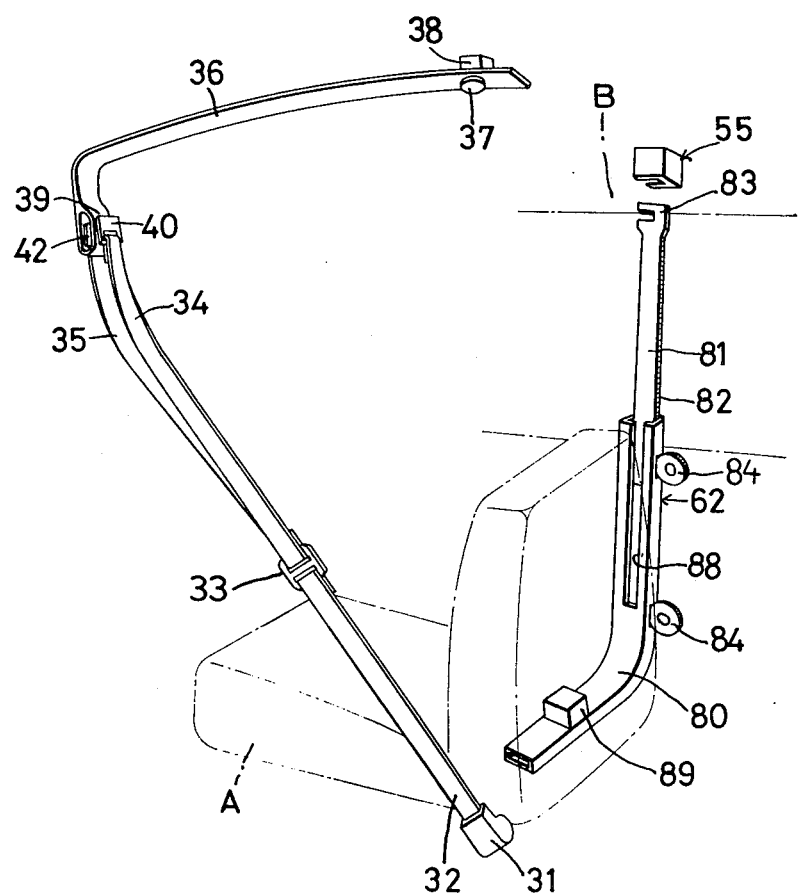

SEAT BELT ASSEMBLY

This invention relates to seat belt assemblies for automobiles for insuring the safety of seated occupants against car accidents, characterized in simplicity of construction and easy handling without the use of any troublesome implements, such as buckles.

Seat belt assemblies which use buckles have been in practical use. The conventional seat belt assemblies are roughly classified into the following two categories: the two-point support type which uses only one belt stretched over the seat occupant from his waist to shoulder, said belt having one end fixed at the lower portion of the seat to one side thereof and the other end fixed at the upper portion thereof to its other side; and the three-point support type which comprises two belts, one belt for fastening the waist of the occupant and the other belt extending from his waist to shoulder. Needless to say, the latter type provides greater protection than the former.

However, such conventional seat belt assemblies require buckles to put them into and out of use. Since such buckles are troublesome to handle, the occupant tends to neglect the use of the assembly. This tendency is stronger particularly in the case of the three-point support type. Moreover, such known seat belt assemblies are inconvenient to store when not in use.

The present invention consists in seat belt assemblies of the three-point support type which enable the belts to be put easily and automatically into and out of their operative position without using any buckles.

A first object of this invention is to provide a safety seat belt assembly characterized in that two belts, stretched between the roof of the car and the seat, move in a predetermined path to such a position as to stretch over the occupant from his waist to shoulder, one belt subsequently going down to serve as a waist belt while the other belt remains there to serve as a shoulder belt.

A second object of this invention is to provide seat belt assemblies of the above-mentioned type in which a pivot arm imparts to the two belts such a movement on a predetermined path.

A third object of this invention is to provide seat belt assemblies of the above-mentioned type in which the belt for binding the waist of the occupant transfers itself from the pivot arm to a transfer means which lowers it to its operative position.

A fourth object of this invention is to provide seat belt assemblies of the above-mentioned type in which said waist belt is lowered and raised as a transfer means is pivoted to and from an inverted position.

A fifth object of this invention is to provide seat belt assemblies of the above-mentioned type in which the waist belt is lowered and raised as a transfer means mounted in the pivot arm projects therefrom and withdraws thereinto.

Other objects and advantages of the invention will become apparent from the following description with reference to the accompanying drawings in which:

FIG. 2 is a partially cutaway front view of the belt-carrying end of the pivot arm of the embodiment of FIG. 1;

FIG. 3 is a partially cutaway side view thereof;

FIG. 4 is a longitudinal sectional side view showing the locking means for locking the belt-carrying end of the pivot arm and the upper portion of the transfer means in the embodiment of FIG. 1;

FIG. 5 is a partially cutaway perspective view of the locking means and the transfer means of FIG. 4;

FIG. 6 is a horizontal sectional view of the locking means of FIG. 4;

FIG. 7 is a partially cutaway front view of the lower end portion of the transfer means of FIG. 4;

FIG. 8 is a perspective view of the second embodiment of this invention, showing the same when not in use;

FIG. 9 is a partially cutaway front view of the belt-carrying end of the pivot arm of the embodiment of FIG. 8;

In the first embodiment shown in FIGS. 1 to 7, letter A designates a seat mounted in a car B, said seat being provided with a belt winder 31 at the lower rear portion of one side thereof. The belt winder 31 is adapted to house a flexible belt 32 so as to enable it to be drawn therefrom for a required length. The belt 32 is secured at its lower end to the belt winder 31.

To the upper end of the belt 32 are connected the lower ends of two belts 34 and 35 by means of a joint 33 which permits simple and rapid disconnection of the belts in case of emergency. Although in FIG. 1 the belts 34 and 35 are the two belt sections of one elongated belt folded in two, they may be constituted by two separate belts. The belt 32 unwinds itself from the belt winder 31 for such a length as for the belts 34 and 35 to fit the body of the occupant of the seat.

Figure 1:
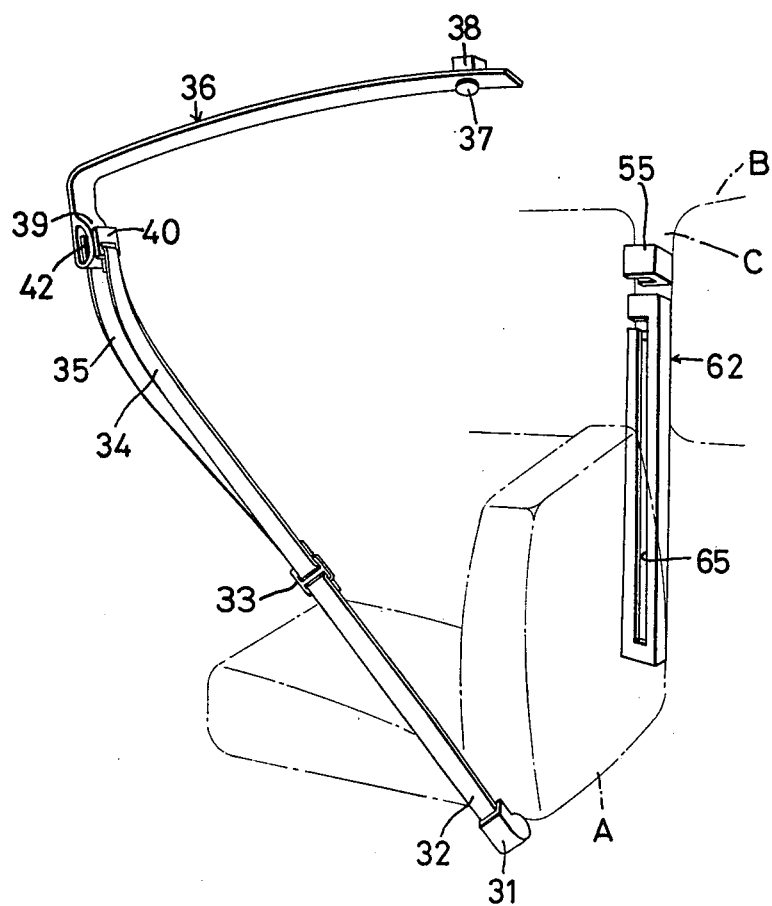
FIG. 1 is a perspective view of the first embodiment of the seat belt assembly according to this invention, showing the same when not in use.

A pivot arm 36 is pivotally mounted to the roof of the car B over the seat A to its side carrying the belt winder 31 so that it can pivot in a horizontal plane around a pivot 37 from the front-facing position shown in FIG. 1 toward the center pillar C of the car B. The pivot 37 for the pivot arm 36 is coupled to a reversible motor 38 mounted on the roof to pivot the pivot arm 36 automatically when a switch suitably disposed in the car is turned on.

The belts 34 and 35 are connected separately at their upper end to the free end of the pivot arm 36. As shown in FIG. 3, one belt 34 is fixedly attached to the inner side of a projecting portion 39 of the pendent end of the pivot arm 36 through a metal plate 40 and a pin 41. The upper end of the other belt 35 is connected to a metal plate 42 from one side of which an axis 43 projects. The projecting axis 43 is provided with one flange 44 at its outer end and another flange 45 halfway of its length so as to divide itself into two axial sections 46 and 47.

The pendent portion of the pivot arm 36 has an opening 48 formed therein and extending from halfway of its bottom to the lower part of its outer side to receive the metal plate 42 carrying the belt 35, and a notch 49 which connects with the opening 48 and extends upward therefrom to receive the axial section 46 of the axis 43.

Intermediately of the notch 49 is provided means for preventing the projecting axis 43 from falling out of the notch 49. Said means comprises a locking piece 51 slidably mounted in a transverse hole 50 open to the notch 49 halfway thereof. A spring 52 biases the locking piece 51 to cause it to project thereinto.

The locking piece 51 is provided with a pin 54 which projects outward through an elongated transverse slit 53 in the outer side wall of the pendent portion. As the arm 36 pivots toward the center pillar C, the pin 54 hits a projection suitably disposed to withdraw the locking piece 51 out of the notch 49, thereby unlocking the projecting axis 43. Thus, the belt 35 is detachably connected at its upper end to the free end of the pivot arm 36.

Although in FIG. 3 the pin 41 secures the metal plate 40 for the belt 34 to the projecting portion 39 at a fixed position, a plurality of mounting holes for the pin 41 may be formed in the projecting portion 39 one above another so that the mounting position for the belt 34 can be changed according to the size of the seat occupant.

As the pivot arm 36 is pivoted toward the center pillar C, it draws the belts 34 and 35 so as to be stretched over the occupant diagonally from his waist to shoulder. Subsequently, only the belt 35 makes it way downward away from the arm 36 to serve as a waist belt. The other belt 34 remains there over the occupant from his waist to shoulder to serve as a shoulder belt.

At the top inside of the center pillar C is provided a locking means 55 for locking the belt-carrying end of the pivot arm 36. As shown in FIGS. 5 and 6, the locking means 55 is constituted by a frame member 57 which is secured to the center pillar C and provided with a recess 56 to receive the portion directly above the pendant portion of the arm 36 thus pivoted.

A locking detent 58 is mounted in one cheek of the frame member 57, biased into the recess 56 by a spring 59. The locking detent 58 is tapered so as to be pushed into from the recess 56 to allow the arm 36 to enter it directly above the pendent portion. After the entry thereof, the locking detent 58 projects again into the recess 56 under the bias of the spring 59 to lock the pivot arm 36 therein.

The locking means 55 further includes a lever 60 for imparting a retracting motion to the locking detent 58, and an electromagnet 61 which attracts the rear end of the lever 60 to retract the locking detent 58 out of the recess 56, thereby releasing the pivot arm 36. (FIG. 6)

To the inner wall of the center pillar C is secured a transfer means 62 which receives the waist belt 35 from the pivot arm 36 and carries it down. The transfer means 62 includes a vertically elongated guide member 63 having its upper end directly below the locking means 55 and its lower end disposed adjacent the floor of the car, and a lowering frame 64 mounted in the guide member 63 for vertical movement therein.

The guide member 63 is fixed substantially vertically to the center pillar C and the side wall of the car directly thereunder as shown in FIG. 1. It is formed to be hollow so as to afford space for vertical movement of the lowering frame 64.

In the inner side wall of the guide member 63, an elongated opening 65 is formed which consists of a transverse portion located adjacent the top end thereof and open at its front end and which is an elongated longitudinal portion connecting with the transverse portion and extending downward therefrom. The elongated opening 65 has a sufficient width for the axial section 47 of the projecting axis 43 to fit loosely therein, and its transverse portion is open at such a height as to receive the axial section 47 therein as the pivot arm 36 is pivoted toward the center pillar C.

In the front face of the lowering frame 64 a recess 66 is formed to receive the axial section 47 and a large hole 67 is formed to receive the flange 44 on the projecting axis 43. The lowering frame 64 is moved up and down in the guide member 63 by a lowering means 68 incorporated therein.

The lowering means 68 comprises pulleys 69 rotatably mounted at the top and bottom within the guide member 63, a wire rope 70 passing over the upper and lower pulleys 69 and with its ends connected to the top and bottom of the lowering frame 64, and a motor 72 provided at bottom of the guide member 63 and coupled to the lower pulley through a gearing 71.

The motor 72 imparts upward and downward movement to the lowering frame 64. In the guide member 63 limit switches $LS_1$ and $LS_2$ are provided at the top and bottom thereof to detect the upper and lower limits of travel of the lowering frame 64, respectively, and to turn off the motor 72, thereby stopping the frame 64 thereat.

When the lowering frame 64 is at its uppermost position, the recess 66 therein aligns itself with the transverse portion of the elongated opening 65 in the guide member 63 to receive the axial section 47. Thus the axial section 47 is located at the crossing between the transverse portion and the longitudinal portion of the elongated opening 65 when the arm 36 is locked by the locking means 55.

It will be understood that when the lowering frame 64 commences its downward movement, the axial section 47 travels down the longitudinal portion of the elongated opening 65.

As the pivot arm 36 gets locked by the locking means 55, the pin 54 hits said projection to withdraw the locking piece 51 from the notch 49 against the bias of the spring 52, thereby allowing the projecting axis 43 to leave the notch 49 downward. As the lowering frame 64 goes down, the projecting axis 43 is lowered along the elongated opening 65 in the guide member 63. On its way down, the projecting axis 43 is prevented from detachment toward the interior of the car since its outer flange 44 is caught in the large hole 67 in the lowering frame 64. The projecting axis 43 carries the waist belt 35 downward into its operative position.

The transfer means 62 further includes a locking means 73 mounted in the guide member 63 at its bottom for locking the lowering frame 64 in its lowermost position. The locking means 73, the operation of which is substantially the same as that of the upper locking means 55, which comprises a locking detent 74, a spring 75, an arm 76, and an electromagnet 77. A command to retract the locking detent 74 is given to the electromagnet 77 by operating a seat belt release switch suitably disposed.

The lowering frame 64 in this embodiment may be replaced by a lowering member provided with a projection which, when the pivot arm 36 is pivoted, fits in a recess formed in the axial section 47 to move the waist belt 35 down.

The operation of the first embodiment of this invention will now be explained below. When the seat belt assembly is not in use, the belt-carrying end of the pivot arm 36 points to the front of car B. As shown in FIG. 1, the belts 34 and 35 extend obliquely from the bottom rear of one side of seat A to the free end of the pivot arm 36.

After adjusting the belt 32 from the belt winder 31 to a suitable length, the seat occupant turns on a start switch (not shown) disposed conveniently. First the motor 38 starts to pivot the arm 36 around the pivot 37 toward the center pillar C. The pivot arm 36 pulls the belts 34 and 35 on an arcuate path so as to be stretched diagonally over the occupant from his waist to shoulder.

As the pivot arm 36 reaches the center pillar C, it forces into the recess 56 in the locking means 55, pushing against the locking detent 58. After entry thereof, the locking detent 58 projects again into the recess 56 to lock the pivot arm 36.

Simultaneously, the axial section 47 of the projecting axis 43 fits into the transverse portion of the elongated opening 65 in the guide member 63 and into the recess 66 in the lowering frame 64 with the outer flange 44 received in the large hole 67. The locking piece 51 also retracts from the notch 49 to allow the projecting axis 43 to go down.

The locking of the pivot arm 36 by the locking means 55 is detected by a limit switch (not shown) mounted therein. At the same time, the motor 72 starts to travel the lowering frame 64 downward, guided by the guide member 63. The projecting axis 43 will come out of the notch 49 and go down carrying the waist belt 35.

When the lowering frame 64 reaches its lowermost position, the limit switch $LS_2$ operates to stop the motor 72 and the lowering frame 64 gets locked by the locking means 73.

The shoulder belt 34 remains held adjacent the shoulder of the seat occupant. The waist belt 35 thus lowered is secured there so as to bind the waist of the occupant. The belts 34 and 35 now hold him securely against the seat A to insure his safety during driving.

The seat belt assembly is releasable by operating a release switch (not shown). This actuates the electromagnet 77 for the locking means 73 to retract the locking detent 74 and simultaneously energizes the motor 72 to start in the reverse direction.

The lowering frame 64 will go up carrying the waist belt 35. As the lowering frame 64 approaches its uppermost position, the axial section 46 of the projecting axis 43 forces back into the notch 49 in the pendent portion of the arm 36.

When the limit switch $LS_1$ operates to stop the lowering frame 64, the electromagnet 61 in the locking means 55 is actuated to retract the locking detent 58 to unlock the pivot arm 36 from the locking means 55. The motor 38 is then made to rotate in the reverse direction so that the pivot arm 36 is pivoted back to the original front-facing position, carrying the belts 34 and 35 so as to free the occupant from confinement.

The second embodiment of this invention shown in FIGS. 8 and 9 will now be described. In this and subsequent embodiments, equivalents to those of the first embodiment will be omitted from the description, but will be given the same reference numbers.

The second embodiment has a transfer means 62 adapted for use in cars having no center pillar. The transfer means 62 comprises a curved tubular guide member 80 secured to the side wall and the floor of the car B, and a lowering arm 81 mounted to be longitudinally movably guided thereby.

The lowering arm 81 is made of a flexible material, such as synthetic resin to be movable into and out of the curved guide member 80. However, the guide member 80 is formed to be curved arcuately, not sharply, for smooth sliding movement of the lowering arm 81 therein.

The lowering arm 81 has a rack 82 formed on one edge thereof and is provided with a retaining portion 83 at its top end to receive the projecting axis 43 carrying the waist belt 35 from the pivot arm 36 and retain the same.

Intermediately of one side of the guide member 80 pinions 84 are mounted for engagement with the rack 82 on the lowering arm 81 and a reversible motor (not shown) is provided for driving the pinions 84 to impart longitudinal movement to the lowering arm 81, which receives the waist belt 35 from the pivot arm 36 and carries it down.

The retaining portion 83, shown in FIG. 9 by an alternate long and short dash line, has a horizontal recess 85 formed therein to be open at its front to receive the axial section 47 of the projecting axis 43. At the innermost position of the recess 85, a magnet 86 is provided which attracts the axial section 47. To the upper and lower walls in the recess 85, flat springs 87 are mounted which normally project into the recess 85 to prevent the axial section 47 from falling out of it, but permit forced entry thereof.

The guide member 80 is provided with a longitudinal opening 88 extending downward from its top end to allow the axial section 46 of the projecting axis 43 to travel downward beyond the top end of the guide member 80 as the lowering arm 81 goes down.

Greater safety can be achieved by providing a locking means 89, though not illustrated in detail, at the lower portion of the guide member 80 to lock the arm 81 in its lowermost position. Like the locking means 55 for the pivot arm 36, the locking means 89 can be constituted by a locking detent, an oscillating arm, an electromagnet, and a spring.

In the second embodiment, the waist belt 35 is removably attached to the pivot arm 36 in a different manner. Like the retaining portion 83, a magnet 90 is disposed at the topmost of the notch 49 and flat springs 91 are mounted on its inside walls.

In the second embodiment, another guide member (not shown) may be provided which extends upwardly from the upper end of the guide member 80 to direct the motion of the lowering arm 81.

The operation of the second embodiment of this invention will now be explained. As the pivot arm 36 gets locked by the locking means 55 after pivotal movement, the axial section 47 of the projecting axis 43 is forced into the recess 85 in the retaining portion 83 of the lowering arm 81 in its topmost position against the bias of the flat springs 87.

When the lowering arm 81 thus receives the upper end of the waist belt 35, the motor drives the pinions 84 to move the lowering arm 81 down the guide member 80. The projecting axis 43 is forcedly pulled out of the notch 49 in the pivot arm 36.

Carrying the waist belt 35, the lowering arm 81 goes down the side of the seat A until it reaches its lowermost position. The belt 35 now binds the seat occupant across his waist to serve as a waist belt.

When the release button (not shown) is turned on, the motor causes the pinion 84 to rotate in the reverse direction to raise the lowering arm 81 carrying the waist belt 35. As it reaches its uppermost position, the axial section 46 of the projecting axis 43 is forced into the notch 49 in the pivot arm 36 against the bias of the flat springs 91. The waist belt 35 now extends in parallel with the shoulder belt 34.

A switch (not shown) detects the entry of the projecting axis 43 into the notch 49 to disengage the locking means 55 and cause the motor 38 to rotate in the reverse direction. The pivot arm 36 will be unlocked and pivoted to its original front-facing position.

The third embodiment of this invention shown in FIGS. 10–16 will be explained below.

The third embodiment, too, comprises the transfer means 62 adapted for use in cars having no center pillar. The transfer means 62 comprises a vertical pivot arm 100 having its lower end pivotally mounted to the side wall of the car. In this embodiment, the waist belt 35 is removably attached to the end of the pivot arm 36 by inserting the projecting axis 43 from the side, not from under.

At the pendent end of the pivot arm 36 a projecting portion 39 is provided, and the inner side thereof has coupled thereto the shoulder belt 34.

From both sides of the metal plate 42 to which the upper end of the waist belt 35 is connected, axes 101 and 102 project coaxially, said axes each having a flange at the end thereof.

The projecting portion 39 has a recess 103 formed therein to receive the projecting axis 102 with its flange. The recess 103 is open on the inner side and the front end when the pivot arm 36 is in its pivoted position. In the recess 103 a magnet 104 and flat springs 105 are mounted and both performing similarly.

Figure 10:
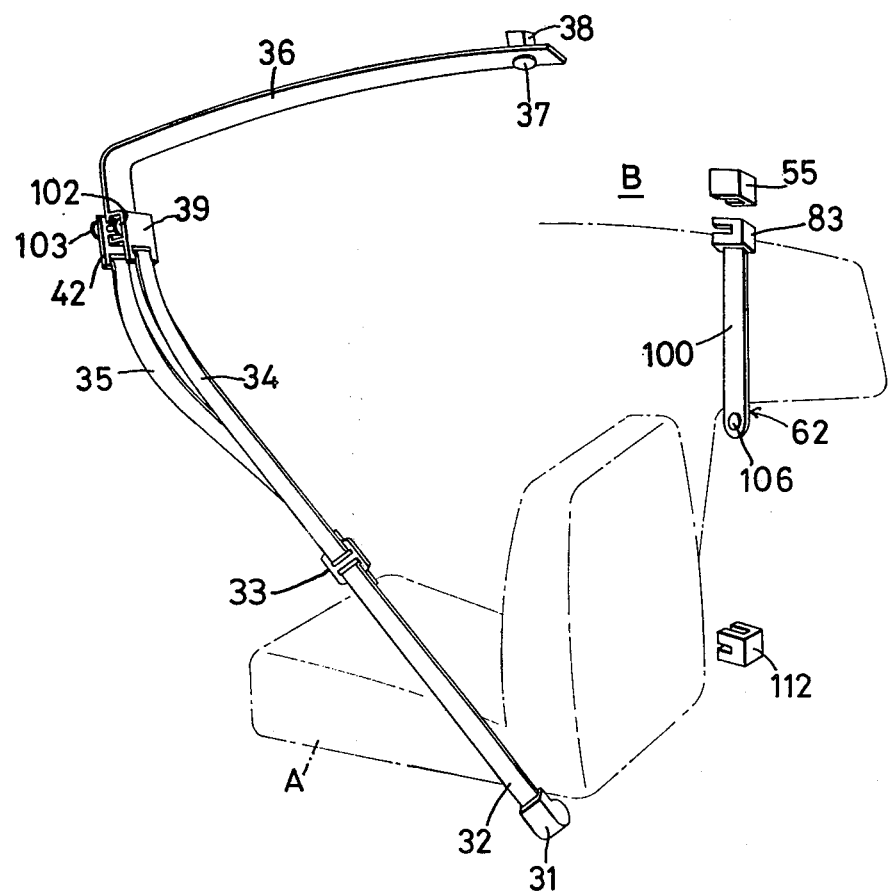
FIG. 10 is a perspective view of the third embodiment of this invention, showing the same when not in use.
Figure 11:
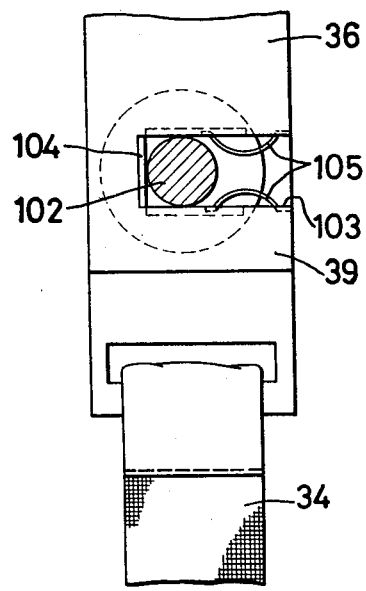
FIG. 11 is a partially longitudinally sectional front view of the belt-carrying end of the pivot arm of the embodiment of FIG. 10.
Figure 12:
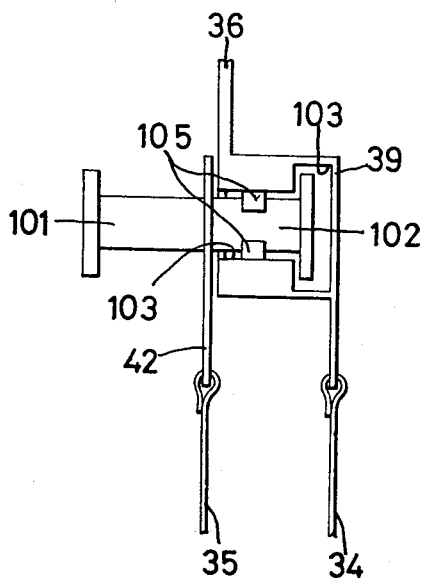
FIG. 12 is a side view thereof.
Figure 13:
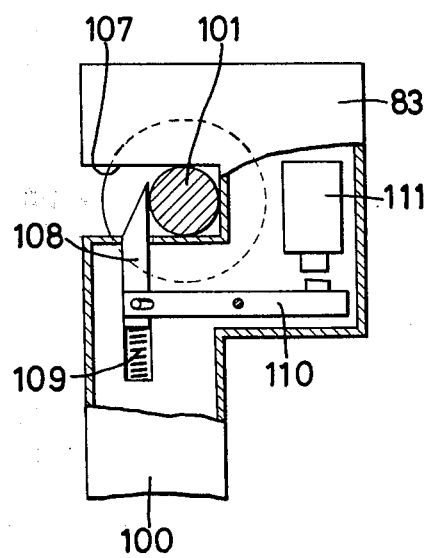
FIG. 13 is a partially cutaway front view of the upper portion of the transfer means of the embodiment of FIG. 10.

The pivot 106 around which the vertical arm 100 is pivoted is coupled to a motor (not shown) to pivot the vertical arm 100 forward from the upright position shown in FIG. 10 to the inverted position. The motor can be controlled by limit switches (not shown) disposed suitably.

The vertical arm 100 has at its upper end a retaining portion 83 to receive the waist belt 35 when it is in its upright position with the pivot arm 36 locked by the locking means 55. The retaining portion 83 has a horizontal recess 107 on the front end to receive the projecting axis 101 carrying the waist belt 35. Like the locking means 55, the retaining portion 83 includes a locking detent 108, a spring 109, an arm 110, and an electromagnet 111.

The locking detent 108 is tapered to permit entry of the projecting axis 101 into the recess 107. The recess 107 is the vertical arm 100 in its upright position is at the same height as the recess 103 in the pivot arm 36 in the pivoted position.

The waist belt 35 now carried by the vertical arm 100 does not come off during pivotal movement thereof to the inverted position, because the locking detent 108 locks the projecting axis 101.

Figure 14:
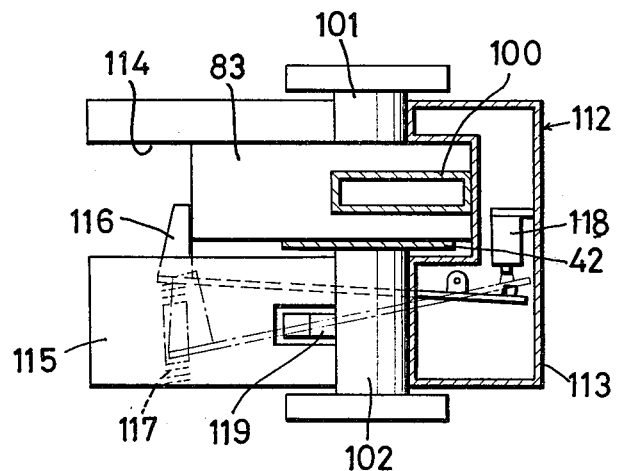
FIG. 14 is a horizontal sectional plan view of the lower locking means of the embodiment of FIG. 10 for locking the transfer means of FIG. 13 in its inverted position.

A locking means 112 is provided right under the vertical arm 100 to lock the latter in its inverted position. As shown in FIG. 14, the locking means 112 comprises a body 113 having a vertical notch 114 open at the top, bottom and front faces thereof to receive the retaining portion 83 and the metal plate 42, and a horizontal notch 115 to receive the projecting axes 101 and 102. Incorporated in the body 113 are a locking detent 116 acting on the retaining portion 83, a spring 117, and an electromagnet 118, and another set of a locking detent 119 and a spring and an electromagnet (not shown) acting on the projecting axis 102. These locking detents 116 and 119 perform just as the locking detent 58 for the locking means 55 does.

Figure 15:
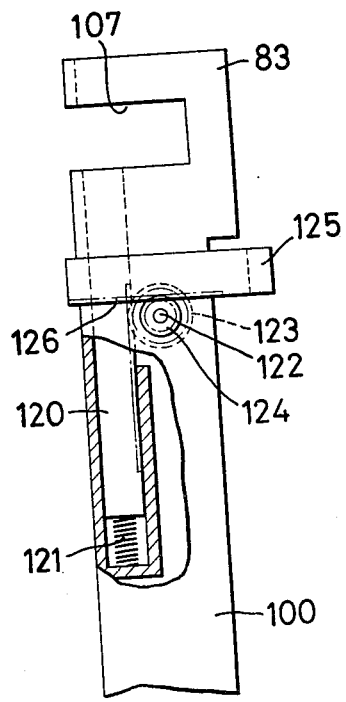
FIG. 15 is a partially cutaway front view of an alternative of the lowering means of FIG. 13.
Figure 16:
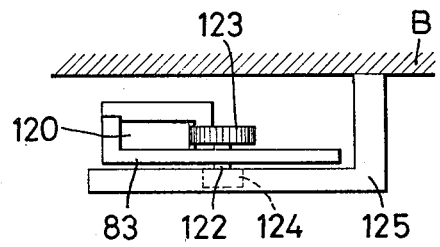
FIG. 16 is a sectional plan view thereof.
Figure 17:
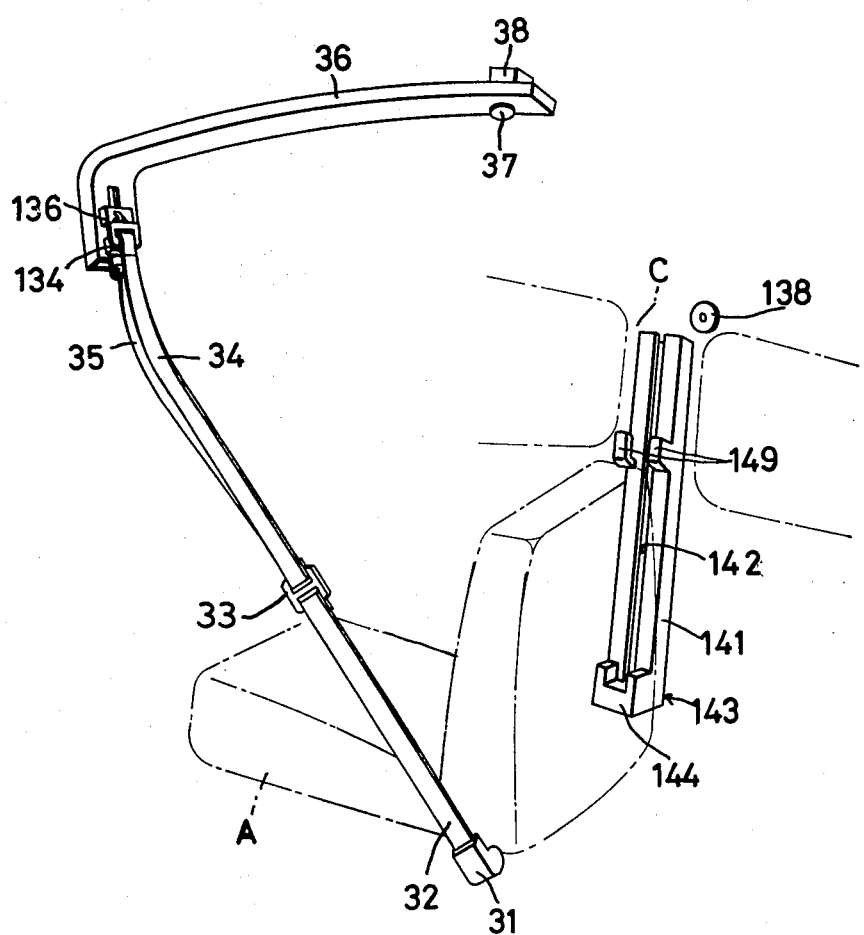
FIG. 17 is a perspective view of the fourth embodiment of this invention, showing the same when not in use.
Figure 18:
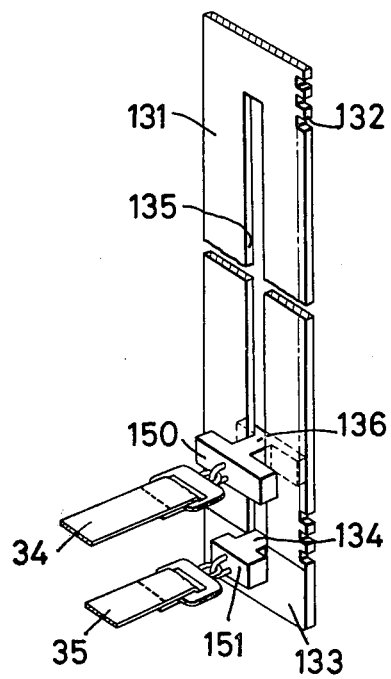
FIG. 18 is a perspective view of the transfer means incorporated in the pivot arm of the embodiment of FIG. 17.
Figure 19:
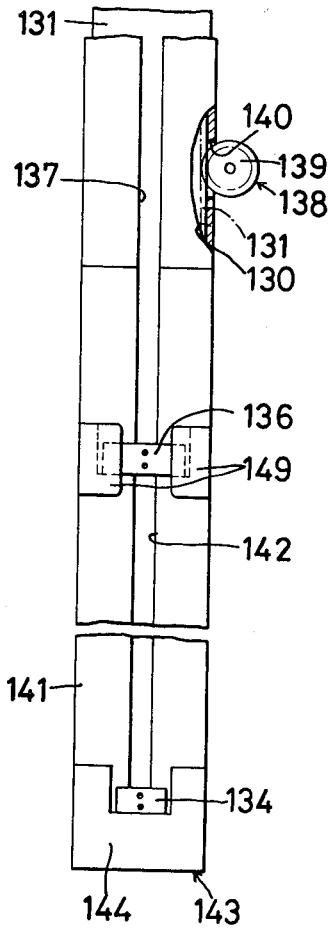
FIG. 19 is a partially cutaway front view of the transfer means of FIG. 18, showing the blocks locked.
Figure 20:
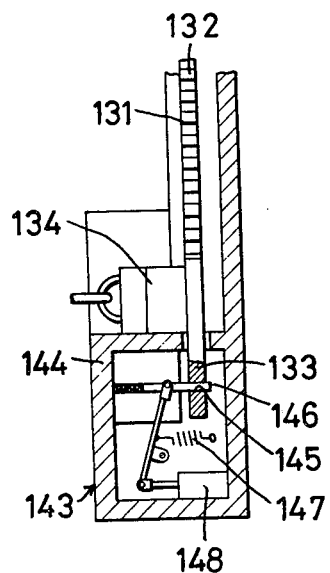
FIG. 20 is a longitudinal sectional side view of the lower locking means of the embodiment of FIG. 17.

FIGS. 15 and 16 show alternative means for locking the projecting axis 101 received by the vertical arm 100.

A rack lever 120 is longitudinally mounted in the vertical arm 100 at its front portion, the rack lever 120 being biased by a spring 121 to project into the recess 107.

On one end of a transverse shaft 122 rotatably mounted through the vertical arm 100 a pinion 123 is mounted and engages the rack lever 120, and on the other end thereof another pinion 124 is mounted.

Secured to the upper portion of the side wall of the car is an arm 125 of L-shape section to embrace the upper portion of the vertical arm 100 from behind; the arm 125 has a rack 126 formed on the bottom thereof to engage the pinion 124.

Except when the vertical arm 100 is in its upright position, the rack lever 120 projects into the recess 107 to keep the projecting axis 101 retained. Just before the vertical arm 100 returns to the upright position, the pinion 124 engages the rack 126 to rotate the shaft 122, thus causing the pinion 123 to retract the rack lever 120 out of the recess 107. Thus the projecting axis 101 becomes free to go out of the recess 107.

Said alternative locking means requires no electrically operated devices, thus simplifying the electrical circuit.

In operating of the third embodiment, when the assembly is not in use, the pivot arm 36 is in its front-facing position and the vertical arm 100 is in its upright position.

Upon pressing the start switch, the pivot arm 36 pivots sidewardly until it gets locked in the locking means 55 with the projecting axis 101 fitted in the recess 107 in the retaining portion 83. Simultaneously, the motor (not shown) is energized to pivot the vertical arm 100 forward around the pivot 106. The projecting axis 102 is pulled out of the recess 103 in the pivot arm 36.

As the vertical arm 100 pivots downward, the waist belt 35 is carried on an arcuate path. It moves away from the seated occupant for a while, but thereafter toward him until it comes behind the seat to serve as a waist belt.

To release the occupant from the seat belts, the locking means 112 is disengaged and the vertical arm 100 is pivoted upward to return the waist belt 35 to the pivot arm 36. Then, the pivot arm 36 is pivoted back to the original position.

The fourth embodiment of this invention, shown in FIGS. 17 to 20, will now be described.

This embodiment is characterized in that part of the transfer means 62 is incorporated in the pivot arm 36. The latter is formed to be a square tube from at least halfway of its length to the free end thereof to provide a guide channel 130 open at its pendent end.

A movable lever 131 is mounted in the guide channel 130 for longitudinal movement therein. The lever 131 is made of a flexible material such as synthetic resin to flexible to the shape of the pivot arm 36 and be restorable to its original straight form. The lever 131 is provided with a rack 132 on one edge thereof.

The belts 34 and 35 are coupled to the lower end of the lever 131, one above the other. The waist belt 35 is connected through a mounting block 134 to a metal plate 133 secured to the lower end of the lever 131. (FIG. 18) The shoulder belt 34 is connected to the lever 131 through a mounting block 136 slidably mounted in an elongated slit 135 longitudinally formed in the lever 131. The distance between the block 134 and the block 136 is freely adjustable.

A notch 137 is formed in the inner wall of the pivot arm 36 at its end to receive the narrow web portions of the mounting blocks 134 and 136 stacked one upon another when the lever 131 is inserted into the guide channel 130 to the extreme position.

A driving means 138 for the lever 131 is provided at the top of the center pillar C to lower the lever 131 after the pivot arm 36 has been pivoted. The driving means 138 includes a pinion 139 so mounted as to engage the rack 132 on one edge of the lever 131 and a motor (not shown) coupled to the pinion 139. The pivot arm 36 has a slit 140 formed in one edge thereof to allow the pinion 139 to mesh with the rack 132 therethrough when it is in its pivoted position.

The driving means 138 causes the lever 131 to project from and retract into the guide channel 130 when the pivot arm 36 is in its pivoted position.

A guide member 141 is secured vertically to the side wall of car B directly under the center pillar C. The guide member 141 is made in the form of a square tube open at its top end to receive the lever 131 from the pivot arm 36 and guide it downwardly.

In the inner wall of the guide member 141 is formed an elongated opening 142 which extends downward from its top end to receive the narrow web portions of the blocks 134 and 136 and permit their passage therealong.

Provided at the lower end of the guide member 141 is a locking means 143 for locking the lever 131 in its lowermost position. The locking means 143 is incorporated in a box 144, said locking means 143 comprising a detent 146 adapted to project into a through hole 145 in the metal plate 133 upon entry thereof into the box 144, a spring 147, and an electromagnet 148. The locking means 143 functions similarly to the locking means in the foregoing embodiments.

Intermediately of its length the guide member 141 is provided with stoppers 149 to project on each side of the elongated opening 142. On its way down, the mounting block 136 carrying the shoulder belt 34 hits the stoppers 149 and is hindered from further lowering. It will be seen from FIG. 18 that the block 136 carrying the shoulder belt 34 has a wider head 150 than the head 151 of the block 134 carrying the waist belt 35. The distance between the stoppers 149 is such as to permit passage of the block 134, but not that of the block 136.

This arrangement ensures that as the lever 131 goes down, the belt 34 stops at the upper portion of the guide member 141 to serve as a shoulder belt. The vertical position of the stoppers 149 can be adjusted according to the size of the seat occupant.

Even after the block 136 has stopped, the lever 131 continues to go down carrying the waist belt 35. When in its lowermost position, the lever 131 is locked by the locking means 143, and the waist belt 35 is stretched across the waist of the occupant. The block 136 is now held between the upper edge of the elongated slit 135 and the stoppers 149.

The lever 131 is of a sufficient length for its upper end to be still in the pivot arm 36 and to have the rack 132 in engagement with the pinion 139 even with the lever 131 locked.

In operation of the fourth embodiment, when the pivot arm 36 is pivoted for a predetermined angle, the rack 132 on the lever 131 comes into engagement with the pinion 139. Then, the driving means 138 starts to pull the lever 131 out of the pivot arm 36 and into the guide member 141.

As mentioned above, the shoulder belt 34 is hindered by the stoppers 149 from further lowering to serve as a shoulder belt, while the waist belt 35 goes on lowering past the stoppers 149 until it reaches its lowermost position to serve as a waist belt.

When a release switch (not shown) is operated, the locking means 143 unlocks the lever 131 and the latter is pulled up back into the pivot arm 36. As the lever 131 goes up, the block 134 pushes up the block 136 off the stoppers 149. Thus, these two blocks go up one upon another toward the pivot arm 36, which is then pivoted back to the original position.

Figure 21:
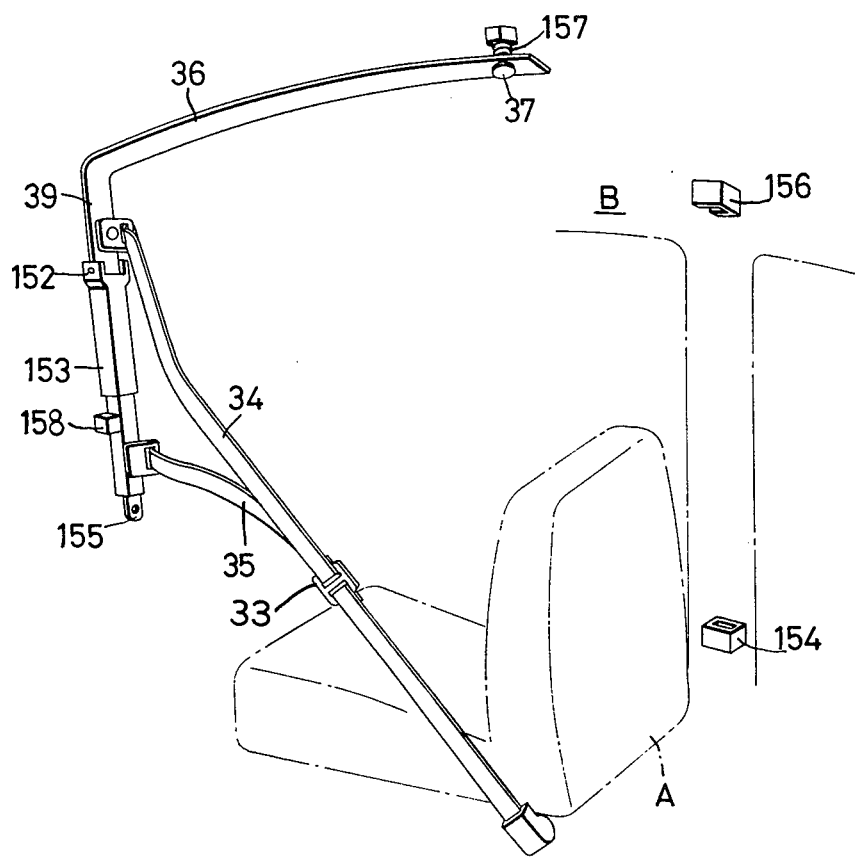
FIG. 21 is a perspective view of the fifth embodiment of this invention, showing the same when not in use.

The fifth embodiment of this invention shown in FIG. 21 will be described.

This embodiment is characterized in that the pendent portion of the pivot arm 36 further extends downward.

The waist belt is connected to the lower end of the extension at a distance from the shoulder belt, unlike the foregoing embodiments in which these two belts are connected side by side.

Disposed below the mounting position for the shoulder belt are a turnable connector 152 and a spring-loaded telescopic member 153 extensible downwardly. The telescopic member 153 is contracted under the pull of a spring (not shown) unless it is pulled downward.

The connector 152 is turnable toward the seat to avoid collision of the pendent portion against the handle of the car during the pivotal movement of the pivot arm 36.

To the lower end of the pendent portion is attached a metal plate 155 which is received in a locking means 154 under the center pillar and locked by a detent (not shown) thereof to retain the waist belt.

The operation of the fifth embodiment will be described assuming that the assembly is manually operated. When not in use, the pendent portion is contracted with the telescopic member 153 pulled up by said spring.

The seat occupant pivots the pivot arm 36 toward the center pillar, holding it on a projection 158 provided for easy handling. The pivot arm 36 gets locked by an upper locking means 156. The pendent portion is then manually pulled down against the pull of the spring into confinement by the lower locking means 154. The shoulder and waist belts are now in their operative position to the seat occupant.

When a release switch (not shown) is pressed, the upper and lower locking means 156 and 154 are disengaged. The spring in the telescopic member 153 pulls up the pendent portion off the lower locking means 154. A spring 157 mounted on the pivot 37 then causes the pivot arm 36 to pivot back to the original position.

What is claimed is:

1. A seat belt assembly for an automobile seat comprising:
    pivot arm means pivotably mounted to the roof of said automobile above the side of said seat for pivotably rotating in a horizontal plane thereabove;
    first said belt means attached to the free end of said pivot arm means for fitting across the torso of a person seated on said automobile seat;
    second seat belt means removably attached to the free end of said pivot arm means for fitting across the lap of a person seated on said automobile seat;
    belt retracting means operatively connected to the free ends of said first and second belt means opposite the ends thereof connected to said pivot arm means and positioned at the lower side of said automobile seat below said pivot arm means for extending said first and second seat belt means to fit across the person seated on said seat when said pivot arm means is rotated;
    lock means positioned on the inside wall of said automobile in the path of rotation of said pivot arm means for engaging and locking said pivot arm means when said pivot arm means is rotated and said first and second seat belt means are crossed over the person on said seat; and
    transfer means positioned beneath said lock means on the inside of said automobile wall in the path of said second seat belt means rotating with said pivot arm means for engaging said second seat belt means when said pivot arm means is rotated and locked in said lock means and for lowering said second seat belt means downward from said pivot arm means across the lap of the person on said seat and locking said second seat belt means in position across the person's lap.

2. An assembly as claimed in claim 1 wherein said belt retracting means is comprised of:
    a belt retractor secured to said automobile at the lower side of said seat; and
    a belt retractably mounted in said retractor and connected to said first and second seat belt means at the end thereof opposite the end connected to said retractor.

3. An assembly as claimed in claim 1, wherein said transfer means is comprised of:
    a curved guide member secured to the side wall of said automobile adjacent said seat and beneath said locking means; and
    a lowering arm vertically slidable within said curved guide member and engageable with said second seat belt means.

4. An assembly as claimed in claim 1, wherein said transfer means is comprised of:
    a vertical pivot arm pivotably mounted on the side wall of said automobile beneath said locking means and engageable with said second seat belt means; and
    pivot arm locking means on the side wall of said automobile beneath said vertical pivot arm for receiving and locking said vertical pivot arm when said vertical pivot arm is pivoted downward.

5. An assembly as claimed in claim 1, wherein said first seat belt means is longitudinally adjustable on said pivot arm means.

6. A seat belt assembly for an automobile seat comprising:
    pivot arm means pivotably mounted to the roof of said automobile above the side of said seat for pivotably rotating in a horizontal plane thereabove, said pivot arm means being comprised of:
        a hollow pivot arm pivotably mounted to the roof of said automobile,
        a flexible lever member slidably fitted within said pivot arm, said lever member having a longitudinal groove therein,
        a first mounting block slidably mounted in said groove in said lever member, and
        a second mounting block fixedly mounted in said groove in said lever member beneath said first mounting block, said second mounting block being narrower than said first mounting block;
    first seat belt means attached to said first mounting block of said pivot arm means for fitting across the torso of a person seated on said automobile seat;
    second seat belt means attached to said second mounting block of said pivot arm means for fitting across the lap of a person seated on said automobile seat;
    belt retracting means operatively connected to the free ends of said first and second seat belt means opposite the ends thereof connected to said mounting blocks and positioned at the lower side of said automobile seat below said pivot arm means for extending said first and second seat belt means to fit across the person seated on said seat when said pivot arm means is rotated; and
    transfer means on the inside of said automobile wall adjacent said seat and beneath said pivot arm means for contacting said flexible lever member and moving said lever member and said first and second seat belt means downward across the torso and lap of the person on said seat and for locking said second seat belt means in position across the person's lap, said transfer means being comprised of:
        a guide member secured to the side wall of said automobile adjacent said seat, said guide member having a groove therein large enough to receive said flexible lever member,
        drive means above said guide member for contacting said lever member when said pivot arm means is rotated and for lowering said lever member and said first and second mounting blocks into said groove in said guide member,
        said guide member further having stopper means projecting therefrom for stopping the downward movement of said first mounting block in said groove in said guide member while allowing said narrower second mounting block to pass thereby, and locking means at the bottom of said groove in said guide member for locking said flexible lever member with said second belt means attached thereto.

7. A seat belt assembly for an automobile seat comprising:
   pivot arm means pivotably mounted to the roof of said automobile above the side of said seat for pivotably rotating in a horizontal plane thereabove, said pivot arm means being comprised of:
      a spring mounted pivot arm mounted to the roof of said automobile above the side of said seat,
      spring loaded telescopic member means rotatably mounted to the end of said pivot arm means and extending downward therefrom for telescopically extending downward from said pivot arm, and
      a metal piece attached to the bottom of said telescopic member means and extending downward therefrom;
   first seat belt means attached to said pivot arm means above said telescopic member means for fitting across the torso of a person seated on said automobile seat;
   second seat belt means attached to said telescopic member means for fitting across the lap of a person on said automobile seat;
   belt retracting means operatively connected to the ends of said first and second seat belt means and said telescopic member means, said seat belt retracting means being positioned at the lower side of said automobile seat below said pivot arm means for extending said first and second seat belt means to fit across the person seated on said seat when said pivot arm means is rotated and said telescopic member means is extended;
   first lock means positioned on the inside wall of said automobile on the path of rotation of said pivot arm means for engaging and locking said pivot arm means when said pivot arm means is rotated and said first and second seat belt means are crossed over the person on said seat; and
   second lock means positioned on the inside wall of said automobile beneath said first lock means for receiving and locking therein the metal plate attached to the bottom of said telescopic member when said pivot arm means is locked in said first lock means and said telescopic member is forced downward into said second lock means.

* * * * *